US008639649B2

(12) United States Patent
McSherry et al.

(10) Patent No.: US 8,639,649 B2
(45) Date of Patent: Jan. 28, 2014

(54) PROBABILISTIC INFERENCE IN DIFFERENTIALLY PRIVATE SYSTEMS

(75) Inventors: Frank D. McSherry, San Francisco, CA (US); Oliver M. C. Williams, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 394 days.

(21) Appl. No.: 12/729,260

(22) Filed: Mar. 23, 2010

(65) Prior Publication Data

US 2011/0238611 A1 Sep. 29, 2011

(51) Int. Cl.
- G06F 9/44 (2006.01)
- G06N 7/02 (2006.01)
- G06N 7/06 (2006.01)
- G06Q 99/00 (2006.01)
- G06F 3/00 (2006.01)
- G06F 7/04 (2006.01)
- G06F 17/30 (2006.01)

(52) U.S. Cl.
USPC ............... 706/52; 705/325; 708/135; 726/26

(58) Field of Classification Search
USPC ............... 706/52; 705/325; 708/135; 726/26
See application file for complete search history.

(56) References Cited

U.S. PATENT DOCUMENTS

| 6,253,203 B1* | 6/2001 | O'Flaherty et al. ............. 1/1 |
| 6,260,033 B1* | 7/2001 | Tatsuoka ..................... 706/45 |
| 6,301,571 B1* | 10/2001 | Tatsuoka ..................... 706/45 |
| 6,556,960 B1* | 4/2003 | Bishop et al. ................. 703/2 |
| 7,016,529 B2* | 3/2006 | Simard et al. ............... 382/155 |
| 7,092,920 B2* | 8/2006 | Heard ........................ 706/12 |
| 7,421,380 B2* | 9/2008 | Thiesson et al. .............. 703/2 |
| 7,558,765 B2* | 7/2009 | Kiefer ....................... 706/15 |
| 7,840,516 B2* | 11/2010 | Chang et al. ................. 706/47 |
| 7,853,545 B2* | 12/2010 | Chang et al. ................. 706/47 |
| 8,190,540 B2* | 5/2012 | Kiefer ....................... 706/15 |
| 2003/0149248 A1* | 8/2003 | Bellazzi et al. ............... 530/405 |
| 2003/0233197 A1* | 12/2003 | Padilla et al. ................ 702/20 |
| 2004/0054572 A1* | 3/2004 | Oldale et al. ................. 705/10 |
| 2006/0059112 A1* | 3/2006 | Cheng et al. ................. 706/12 |
| 2006/0161527 A1* | 7/2006 | Dwork et al. ................. 707/3 |
| 2006/0167784 A1* | 7/2006 | Hoffberg ..................... 705/37 |
| 2006/0200431 A1* | 9/2006 | Dwork et al. ................. 706/12 |
| 2007/0083493 A1* | 4/2007 | Dwork et al. ................. 707/3 |
| 2007/0124268 A1* | 5/2007 | Dwork et al. ................. 707/1 |
| 2007/0143289 A1* | 6/2007 | Dwork et al. ................. 707/9 |
| 2007/0216675 A1* | 9/2007 | Sun et al. .................... 345/419 |
| 2008/0010043 A1* | 1/2008 | Thiesson et al. .............. 703/2 |

(Continued)

OTHER PUBLICATIONS

Dwork et al., "New Efficient Attacks on Statistical Disclosure Control Mechanisms", CRYPTO 2008, pp. 469-480.*

(Continued)

Primary Examiner — Jeffrey A Gaffin
Assistant Examiner — James F Sugent
(74) Attorney, Agent, or Firm — Microsoft Corporation

(57) ABSTRACT

Given that a differentially private mechanism has a known conditional distribution, probabilistic inference techniques may be used along with the known conditional distribution, and generated results from previously computed queries on private data, to generate a posterior distribution for the differentially private mechanism used by the system. The generated posterior distribution may be used to describe the probability of every possible result being the correct result. The probability may then be used to qualify conclusions or calculations that may depend on the returned result.

16 Claims, 5 Drawing Sheets

(56) References Cited

U.S. PATENT DOCUMENTS

| | | | |
|---|---|---|---|
| 2008/0104006 A1* | 5/2008 | Kiefer | 706/48 |
| 2008/0222058 A1* | 9/2008 | Doctor et al. | 706/12 |
| 2008/0298571 A1* | 12/2008 | Kurtz et al. | 379/156 |
| 2009/0089285 A1* | 4/2009 | Donato et al. | 707/6 |
| 2009/0138416 A1* | 5/2009 | Chang et al. | 706/11 |
| 2009/0164396 A1* | 6/2009 | Chang et al. | 706/16 |
| 2010/0100511 A1* | 4/2010 | Hirose et al. | 706/12 |
| 2010/0153318 A1* | 6/2010 | Branavan et al. | 706/12 |
| 2010/0222903 A1* | 9/2010 | Kim et al. | 700/91 |

OTHER PUBLICATIONS

Dwork et al., "Our Data, Ourselves: Privacy Via Distributed Noise Generation", EUROCRYPTO 2006, pp. 486-503.*

Dwork, Cynthia, "Sub-linear Queries Statistical Databases: Privacy with Power", CT-RSA 2005, pp. 1-6.*

Chawla et al, "Toward Privacy in Public Databases", TCC 2005, pp. 363-385.*

Dwork, Cynthia, et al. "Calibrating noise to sensitivity in private data analysis." Theory of Cryptography (2006): 265-284.*

Dwork, Cynthia. "Differential privacy: A survey of results." Theory and Applications of Models of Computation (2008): 1-19.*

Dwork, Cynthia. "Differential privacy." Automata, languages and programming (2006): 1-12.*

Dwork, Cynthia, and Sergey Yekhanin. "New efficient attacks on statistical disclosure control mechanisms." Advances in Cryptology—CRYPTO 2008 (2008): 469-480.*

Dwork, Cynthia. "Ask a better question, get a better answer a new approach to private data analysis." Database Theory—ICDT 2007 (2006): 18-27.*

Barak, Boaz, et al. "Privacy, accuracy, and consistency too: a holistic solution to contingency table release." Proceedings of the twenty-sixth ACM SIGMOD-SIGACT-SIGART symposium on Principles of database systems. ACM, 2007.*

Kasiviswanathan, Shiva Prasad, and Adam Smith. "A note on differential privacy: Defining resistance to arbitrary side information." arXiv preprint arXiv:0803.3946 (2008).*

McSherry, Frank, and Kunal Talwar. "Mechanism design via differential privacy." Foundations of Computer Science, 2007. FOCS'07. 48th Annual IEEE Symposium on. IEEE, 2007.*

Drechsler, Jörg. Generating Multiply Imputed Synthetic Datasets: Theory and Implementation. Diss. 2009.*

Agrawal, Rakesh, and Ramakrishnan Srikant. "Privacy-preserving data mining." ACM Sigmod Record 29.2 (2000): 439-450.*

"TechFair 2009", Retrieved at <<http://research.microsoft.com/en-us/events/techfair2009/default.aspx#PINQ>>, Jun. 24, 2009, pp. 5.

Silva, et al., "Inference in Distributed Data Clustering", Retrieved at <<http://www-ags.dfki.uni-sb.de/~klusch/i2s/daSilva-icdm05-Extended_kdec-s_-EAAI-06-3-Elsevier.pdf, Oct. 14, 2005, pp. 14.

Merugu, et al., "A Privacy-Sensitive Approach to Distributed Clustering", Retrieved at <<http://www.ideal.ece.utexas.edu/pdfs/53.pdf>>, Pattern Recognition Letters, Oct. 1, 2004, pp. 399-410.

Merugu, et al., "A Probabilistic Approach to Privacy-sensitive Distributed Data Mining", Retrieved at <<http://www.ideal.ece.utexas.edu/papers/srujana03cit.pdf>>, pp. 6.

Bishop, Christopher M., "Pattern Recognition and Machine Learning", Retrieved at <<http://research.microsoft.com/en-us/um/people/cmbishop/prml/bishop-ml.pdf>>, Book Review II, 2006, pp. 3.

Dwork, et al., "Calibrating noise to sensitivity in private data analysis", Retrieved at <<http://people.csail.mit.edu/asmith/PS/sensitivity-tcc-final.pdf>>, In Theory of Cryptography Conference, 2006, pp. 20.

McSherry, et al., "Mechanism design via differential privacy", Retrieved at<<http://research.microsoft.com/pubs/65075/mdviadp.pdf>>, 48th Annual IEEE Symposium on Foundations of Computer Science, (FOCS'07), Oct. 21-23, pp. 10.

Jordan, Michael I, "Learning in Graphical Models", Retrieved at <<http://mitpress.mit.edu/catalog/item/?ttype=2&tid=8141>>, Nov. 1998, p. 1.

Mackay, David, J.C., "Information Theory, Inference and Learning Algorithms", Retrieved at <<http://www.inference.phy.cam.ac.uk/itprnn/book.pdf>>, Mar. 28, 2005, pp. 640.

Chaudhuri, et al., "Privacy-preserving logistic regression", Retrieved at <<http://www1.ccls.columbia.edu/~cmontel/cmNIPS2008.pdf>>, Dec. 8, 2008, pp. 10.

"UCI machine learning repository", Retrieved at <<http://archive.ics.uci.edu/ml/>>, Dec. 18, 2009, pp. 2.

Blum, et al., "Practical privacy: the sulq Framework", Retrieved at <<http://research.microsoft.com/pubs/64351/bdmn.pdf>>, 2005, pp. 15.

Barak, et al., "Privacy, accuracy, and consistency too: a holistic solution to contingency table release", Retrieved at <<http://research.microsoft.com/pubs/64344/contingency.pdf>>, Jun. 11-14, 2007, pp. 9.

Dwork, et al., "Differential privacy and robust statistics", Retrieved at <<http://research.microsoft.com/pubs/80239/dl09.pdf>>, May 31-Jun. 2, 2009, pp. 10.

Samarati, et al., "Generalizing data to provide anonymity when disclosing information (abstract)", Retrieved at <<http://www.csl.sri.com/papers/344/>>, Mar. 1998, p. 1.

Machanavajjhalal, et al., "L—Diversity: Privacy beyond k-anonymity", Retrieved at <<http://www.cs.cornell.edu/~mvnak/pubs/ldiversity-icde06.pdf>>, pp. 12.

Xiao, et al., "M-invariance: towards privacy preserving re-publication of dynamic Datasets", Retrieved at <<http://www.cse.cuhk.edu.hk/~taoyf/paper/sigmod07.pdf>>, Jun. 11-14, 2007, pp. 12.

Lindell, et al., "Privacy preserving data mining", Retrieved at <<http://www.pinkas.net/PAPERS/id3-final.pdf>>, Proceedings Advances in Cryptology—CRYPTO 2000, 20th Annual International Cryptology Conference, Aug. 20-24, 2000, pp. 26.

Jordan, et al., "An introduction to variational methods for graphical models", Retrieved at <<http://www.cs.berkeley.edu/~jordan/papers/variational-intro.pdf>>, Machine Learning, 37, 1999, pp. 183-233.

* cited by examiner

PROBABILISTIC INFERENCE IN DIFFERENTIALLY PRIVATE SYSTEMS

BACKGROUND

A system is said to provide differential privacy if the presence or absence of a particular record or value cannot be determined based on an output of the system, or can only be determined with a very low probability. For example, in the case of a website that allows users to rate movies, a curious user may attempt to make inferences about the movies a particular user has rated by creating multiple accounts, repeatedly changing the movie ratings submitted, and observing the changes to the movies that are recommended by the system. Such a system may not provide differential privacy because the presence or absence of a rating by a user (i.e., a record) may be inferred from the movies that are recommended (i.e., output).

Typically, systems provide differential privacy by introducing some amount of noise to the data or to the results of operations or queries performed on the data. While the addition of noise to the results of operations may not be problematic for systems such as the rating system described above, for some systems such noise may be problematic. For example, in a system of medical records that provides differential privacy, users may want a probability distribution of the noise that is added to the results.

SUMMARY

In order to provide differential privacy protection to a private data set, a system may add noise to the results of queries performed on the private data set. The system may add the noise using a differentially private mechanism with a known conditional distribution. In making queries from the data set, a user may wish to infer some information from that data, for example the average of some quantity. Given that the differentially private mechanism has a known conditional distribution, probabilistic inference techniques may be used along with the known conditional distribution, and generated results from previously computed queries on the private data, to generate a posterior distribution over the unknown quantity of interest. The generated posterior distribution may be used to describe the probability of any value being the correct value for the quantity of interest. The probability may then be used to qualify conclusions or calculations that may depend on the returned result.

In an implementation, a result is generated by a differentially private computation from a private data set. A posterior distribution for the result given the differentially private computation is retrieved, and the posterior distribution is provided to a user.

Implementations may include some or all of the following features. The result may be provided to the user. A conditional distribution of the differentially private computation may be determined. The posterior distribution may be inferred using the conditional distribution. Inferring the posterior distribution using the conditional distribution may include retrieving results from previous executions of the differentially private computation, and inferring the posterior distribution using the conditional distribution and the results using probabilistic inference. Using probabilistic inference may include using Markov Chain Monte Carlo methods. The conditional distribution may be a Laplacian distribution or a Gaussian distribution. The differentially private computation may be an exponential mechanism. The private data set may comprise census data. The private data set may comprise medical data.

In an implementation, a first result is received at a computing device through a network. The first result is generated from a second result of a private data set using a differentially private computation. A conditional distribution of the differentially private computation is determined. A plurality of results from previous executions of the differentially private computation is retrieved. A posterior distribution of the differentially private computation is probabilistically inferred using the conditional distribution and the plurality of results. The posterior distribution is provided by the computing device.

Implementations may include some or all of the following features. The first result may be provided through the network. The differentially private computation may include an exponential mechanism. Probabilistically inferring the posterior distribution may include probabilistically inferring an approximate posterior distribution using Markov Chain Monte Carlo methods. The conditional distribution may be a Laplacian distribution or a Gaussian distribution. The private data set may include census data. The private data set may include medical data.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
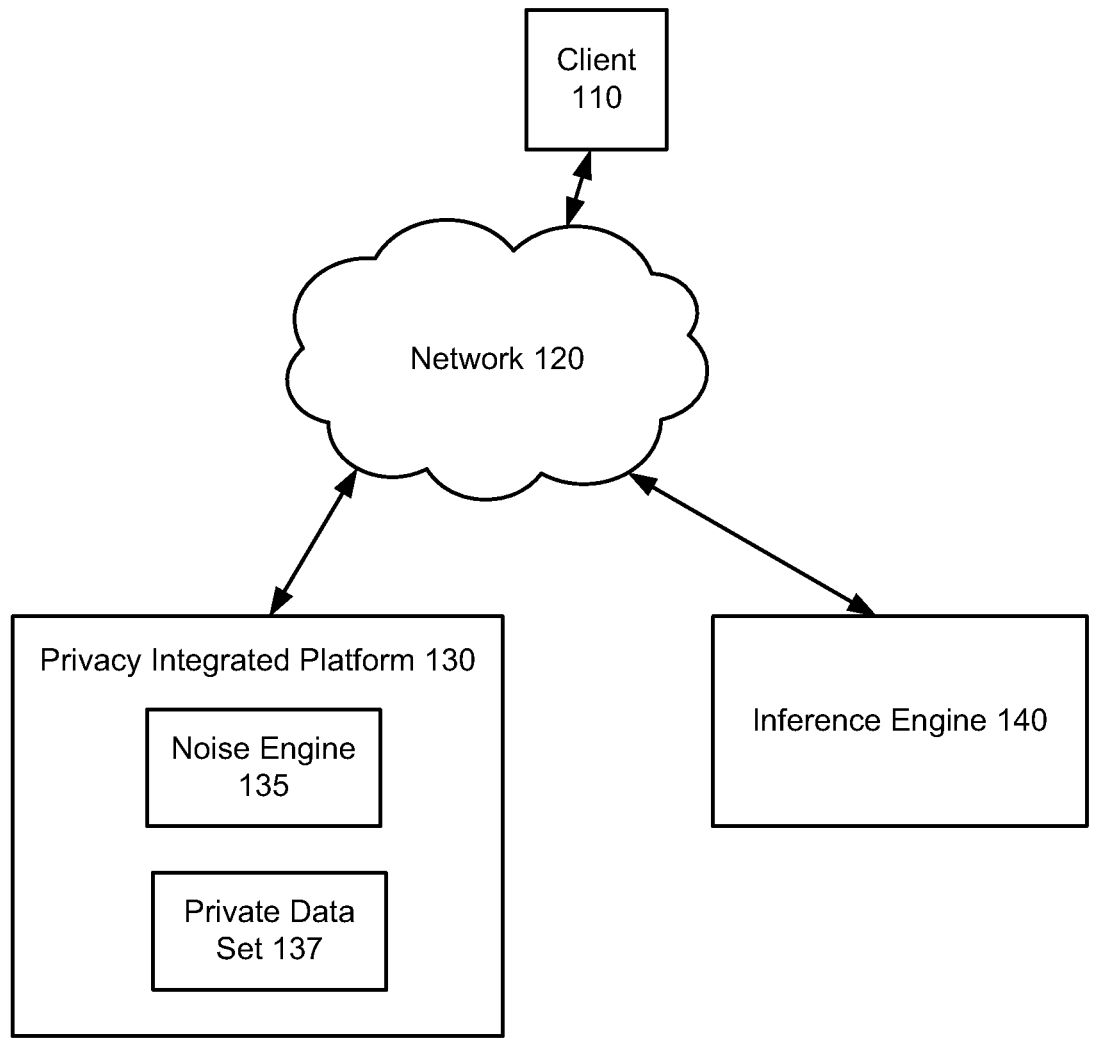
FIG. 1 is a block diagram of an implementation of a system that may be used to provide probabilistic inference for differentially private computations.

FIG. 1 is a block diagram of an implementation of a system 100 that may be used to provide probabilistic inference for differentially private computations. As illustrated the system 100 includes a privacy integrated platform 130. In some implementations, the privacy integrated platform 130 may receive one or more queries from users of a client device 110. The one or more queries may be received from the client device 110 through a network 120. The network 120 may be a variety of network types including the public switched telephone network (PSTN), a cellular telephone network, and a packet switched network (e.g., the Internet). The client device 110 may comprise one or more general purpose computers such as the computing device 500 described with respect to FIG. 5, for example.

The privacy integrated platform 130 may receive the one or more queries and satisfy the received queries from a private data set 137 by generating data or results in response to the queries. The privacy integrated platform 130 may satisfy the queries while providing differential privacy to the private data set 137. Example queries may be for a count of the number of records of the private data set 137 that satisfy or meet specified conditions, or for the value(s) associated with a specified record of the private data set 137. Any type of data queries may be supported by the privacy integrated platform 130. The private data set 137 may be implemented using a database or other data structure and may include a variety of private data and private data sets including medical data, census data, and financial data, for example.

As described above, a system is said to provide differential privacy to a private data set if an output of the system does not disclose the presence or absence of a record in the private data set, or the presence or absence of a record can only be determined with a low probability. Accordingly, a user of the client device 110 may not be able to tell the presence or absence of a record in the private data set 137 based on a response to a query generated by the privacy integrated platform 130. The amount of differential privacy that is provided by the privacy integrated platform 130 is referred to herein as $\epsilon$. Generally, the greater the value of $\epsilon$ used by the privacy integrated platform 130 the less the amount of differential privacy provided to the private data set 137.

More specifically, with respect to Equation (1), a result or output z generated by the privacy integrated platform 130, where $z \in Z$, in response to a query against the private data set 137 from a class of data sets X, may provide $\epsilon$-differential privacy if and only if, for all data sets A, $B \in X$ with symmetric difference one:

$$p(z|A) \leq p(z|B) \times \exp(\epsilon) \qquad (1).$$

For example, if the set A contains the records of all individuals, and the set B contains the records of all individuals except one user (i.e., symmetric difference one), a result z having $\epsilon$-differential privacy means that the log of the likelihood ratio that the one user is present or absent from the private data set 137 given the result z is bounded in magnitude by Equation (2):

$$\left| \log \frac{p(z \mid \text{in database})}{p(z \mid \text{not in database})} \right| = \left| \log \frac{p(z \mid A)}{p(z \mid B)} \right| \leq \epsilon. \qquad (2)$$

In some implementations, the privacy integrated platform 130 may provide differential privacy to a record or result generated in response to a received query through the addition of noise. For example, the privacy integrated platform 130 may retrieve a record from the private data set 137 in response to a query and add noise to value(s) associated with the retrieved record. Alternatively, the privacy integrated platform 130 may perform a query on the private data set 137 to generate a result. Noise may then be added to the result before it is provided to the requesting user.

In some implementations, the noise may be added by a noise engine 135. The noise may be Laplacian or Gaussian noise for example; however, other types of noise may be used. By adding noise to a result before providing the result to a user, the differential privacy of the private data set 137 is protected because the true response to the query is obscured, thereby preventing a user from making any inferences about the private data set 137 with complete certainty.

In some implementations, the noise engine 135 may add noise to the result of a query to generate a result z using a differentially private computation. One such computation is known as an exponential mechanism. An exponential mechanism is a function $\phi: X \times Z \rightarrow R$ (where R is the set of real numbers) such that, as shown by Equation (3), for any input data sets A, $B \in X$, $$|\phi(A,z) - \phi(B,z)| \leq 1 \qquad (3).$$

The exponential mechanism function $\phi$ may return, given a true data set X (i.e., private data set 137) a value z from the conditional distribution of Equation (4):

$$z \sim p(z \mid X, \phi, \epsilon) = \frac{\exp(\epsilon \cdot \phi(X, z))}{\int_Z \exp(\epsilon \cdot \phi(X, \hat{z})) d\hat{z}}. \qquad (4)$$

In some implementations, the privacy integrated platform 130 may provide an indicator of the conditional distribution (i.e., $p(z|X, \phi, \epsilon)$) for the exponential mechanism (or other differentially private computation) used by the noise engine 135 of the privacy platform 130 to generate a noisy result z from the private data set 137 (i.e., X). The conditional distribution may describe the probability distribution for the noisy result z generated by the privacy integrated platform 130. For example, an exponential mechanism with a conditional distribution between −1 and 1 may generate noise values between −1 and 1.

The probability that any possible data set X is the true data set (i.e., the data set X without noise), given noisy results of queries against the true data set, is referred to herein as the posterior distribution over data sets given noisy observations. The probability that any subsequent query f against the true data set has value y, given noisy results of other stored queries against the data set, is referred to herein as the posterior distribution over query results given noisy observations. The conditional distribution of the exponential mechanism used by the privacy integrated platform 130 may be used to determine the posterior distribution over data sets given noisy observations and the posterior distribution over query results given noisy observations.

In some implementations, the privacy integrated platform 130 may also allow a user of the client device 110 to specify the level of differential privacy provided (i.e., the value of $\epsilon$). As the value of $\epsilon$ specified by the user decreases so does the amount of differential privacy protection afforded to the privacy data 137. However, the lower the value of $\epsilon$, the amount of noise that is added to a result increases.

The system 100 may further include an inference engine 140. The inference engine 140 may determine (or approximate) the posterior distribution over data sets given noisy observations and the posterior distribution over query results given noisy observations. The inference engine 140 may be implemented using a general purpose computer such as the computing device 500 described with respect to FIG. 5, for example. While the inference engine 140 is illustrated as being separate from the privacy integrated platform 130 it is for illustrative purposes only. In some implementations, the inference engine 140 may be a component part of the privacy integrated platform 130.

For example, as described above, the privacy integrated platform 130 may return noisy results to provide differential privacy protection to the private data set 137. While these noisy results may provide differential privacy, they may make the values less useful for certain applications such as medicine. The inference engine 140 may make the noisy results more useful in certain circumstances by determining and providing the posterior distribution for the exponential mechanism used to generate the noisy results. The inference engine 140 may calculate the posterior distribution for each exponential mechanism used by the privacy integrated platform 130.

A model may be used for the relationship between the private data set X and the quantity of interest θ:

$$p(X|\theta)$$

In some implementations, the posterior distribution may be determined by the inference engine 140 using Equation (5) to compute the marginal likelihood where X represents the private data set 137, multiplied by a prior over θ:

$$p(\theta|z,\epsilon) \propto p(\theta) \int_X p(z|X,\epsilon) p(X|\theta) dX \qquad (5).$$

Thus, as illustrated in Equation (5), the posterior distribution over the unknown quantity of interest θ is proportional to the integral of $p(z|X, \epsilon)$ (i.e., the conditional distribution) multiplied by the probability of a data set X across all possible data sets X, given θ, multiplied by the prior for θ.

Moreover, in some implementations, additional data or prior information may be known. This preexisting information may be incorporated into the calculation of the posterior distribution by the inference engine 140. For example, a user may have preexisting knowledge about a user whose data is part of the private data set 137. Other preexisting knowledge may also be incorporated such as the number of records in the data or any other information about the data. This preexisting knowledge may be referred to as α, and the probability of X given α may be represented by $p(X|\alpha)$. There may also be prior knowledge about the quantity of interest θ represented by $p(\theta|\alpha)$. The equation for the posterior distribution, $p(\theta|z, \epsilon, \alpha)$, used by the inference engine 140 may incorporate this preexisting knowledge becoming Equation (6):

$$p(\theta|z,\epsilon,\alpha) \propto p(\theta|\alpha) \int_X p(z|X,\epsilon) p(X|\alpha) dX \qquad (6).$$

The inference engine 140 may approximate the posterior distribution from the above formula for the exponential mechanism used by the privacy integrated platform 130 using probabilistic inference and the results of previous executions of the exponential mechanism performed in response to previously received user queries. For example, after each execution of the exponential mechanism, the generated results may be stored by the privacy integrated platform 130 for later use in calculating the posterior distribution of the exponential mechanism by the inference engine 140.

The inference engine 140 may approximate the posterior distribution using probabilistic inference methods such as Markov Chain Monte Carlo methods using the results of previous executions of the exponential mechanism along with the conditional distribution of the exponential mechanism. The approximated posterior distribution may be stored by the inference engine 140 and returned to a user along with a generated noisy result.

In some implementations, the inference engine 140 may determine or approximate the posterior distribution for a variety of different exponential mechanisms or other differentially private computations used by the privacy integrated platform 130 at a variety of different values of ϵ. When a subsequent query is received by the privacy integrated platform 130 from a user, the posterior distribution of the exponential mechanism used to calculate a result in response to the query may be retrieved by the privacy integrated platform 130. The posterior distribution and generated result may then be returned to the user who provided the query, for example.

Figure 2:
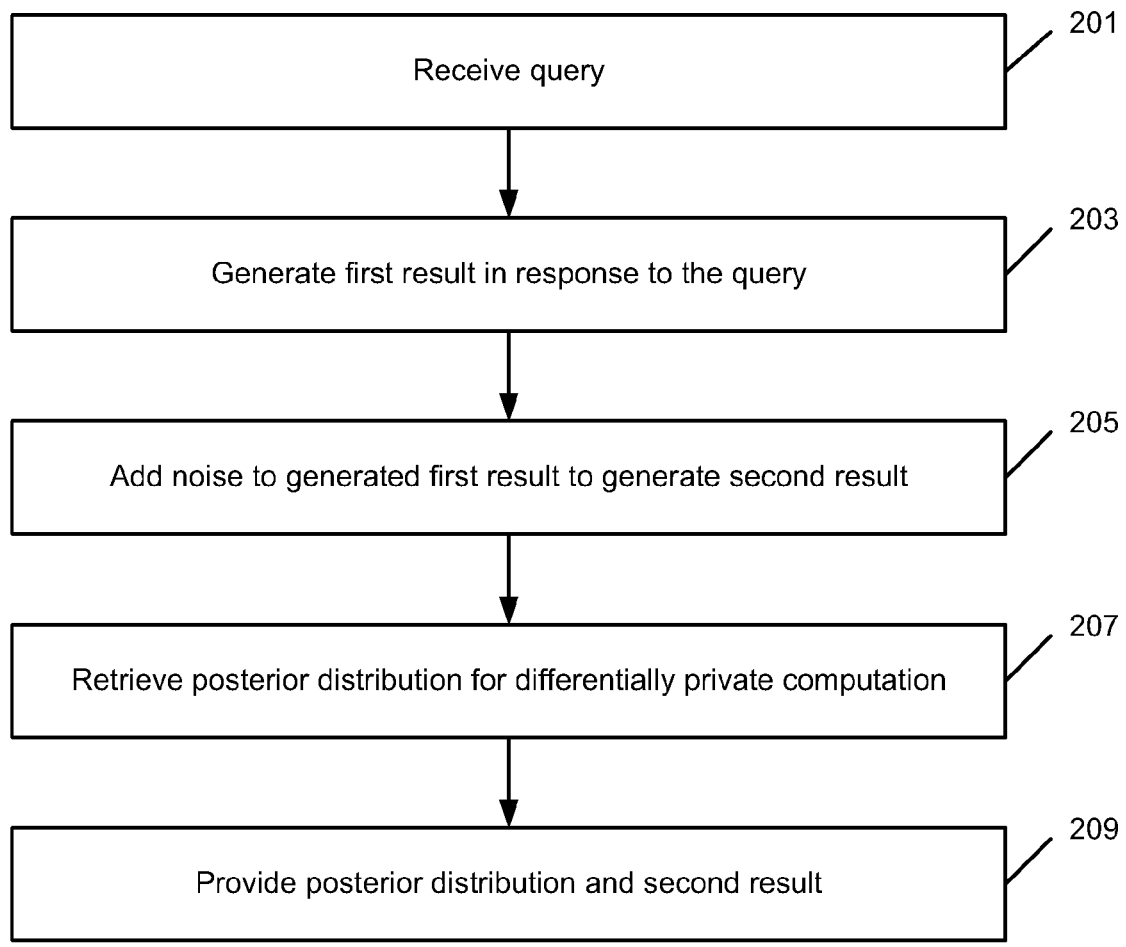
FIG. 2 is an operational flow of an implementation of a method for determining a posterior distribution.

FIG. 2 is an operational flow of a method 200 for determining a posterior distribution. The method 200 may be implemented by the privacy integrated platform 130 and the inference engine 140, for example.

A query is received (201). The query may be received by the privacy integrated platform 130. The query may be received from a user and may be a request for information from a private data set such as the private data set 137. For example, the private data set 137 may be medical or census records.

A first result is generated in response to the query (203). The first result may be generated by the privacy integrated platform 130. The first result may be generated by fulfilling the query from the private data set 137.

Noise is added to the generated first result using a differentially private computation (205). The noise may be added to the first result to generate a second result by the noise engine 135 of the privacy integrated platform 130. In some implementations, the differentially private computation may be an exponential mechanism. The noise may be added to the first result to provide differential privacy protection to the private data set 137. Other methods for providing differential privacy protection may also used.

A posterior distribution for the differentially private computation is retrieved (207). The posterior distribution may be retrieved by the privacy integrated platform 130 from the inference engine 140. The retrieved posterior distribution may have been pre-generated for the differentially private computation used to generate the noise that was added to the first result. The posterior distribution may have been generated for the differentially private computation using a conditional distribution associated with the differentially private computation and the results of one or more previous executions of the differentially private computation. The conditional distribution may be a Laplacian distribution or a Gaussian distribution, for example.

The posterior distribution and generated second result may be provided to a user (209). The posterior distribution and generated second result may be provided by the privacy integrated platform 130 to a user through a network. The user may be the same user who provided the query to the privacy integrated platform 130, for example. As described above, the generated second result may be generated from the first result by the addition of noise to the first result. The addition of noise provides differential privacy protection to the private data set 137, but obscures the true result of the query. Accordingly, by providing the posterior distribution that describes the probability that any generated result in a true result, the user may be able to incorporate the probability into any subsequent calculations or conclusions that depend on the second result.

Figure 3:
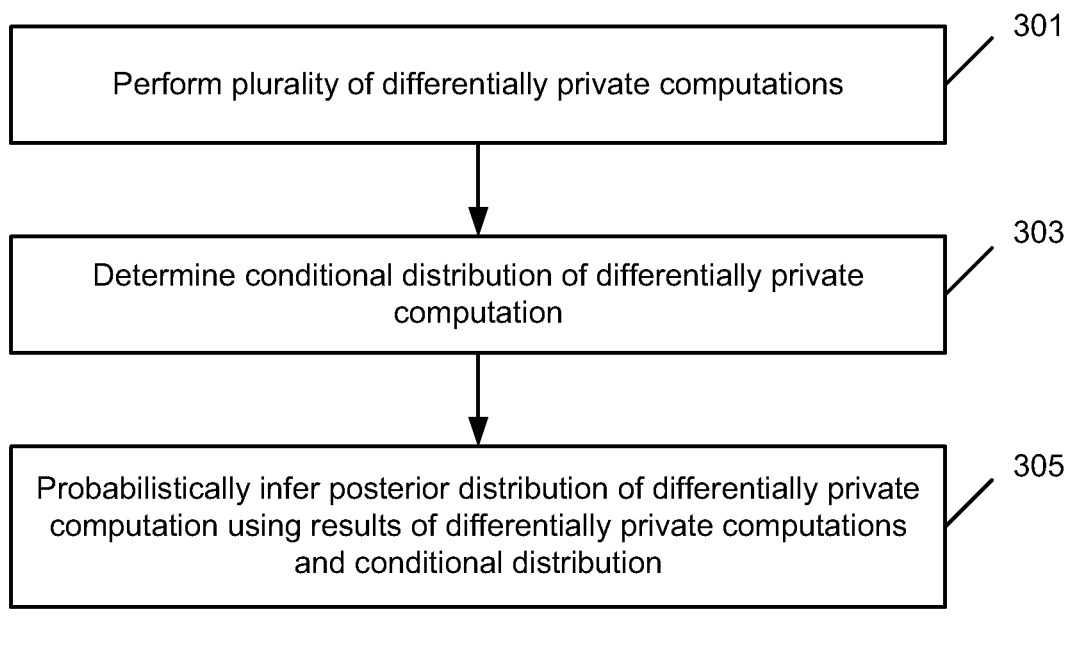
FIG. 3 is an operational flow of an implementation of a method for probabilistically inferring the posterior distribution of a differentially private computation.

FIG. 3 is an operational flow of a method 300 for probabilistically inferring the posterior distribution of a differentially private computation. The method 300 may be implemented by an inference engine 140.

A plurality of differentially private computations is performed (301). The differentially private computations may be performed by the inference engine 140. The differentially private computation may be a differentially private computation used by the privacy integrated platform 130 to generate noise that is added to results generated in response to queries on the private data set 137. In some implementations, the differentially private computation is an exponential mechanism. Other differentially private computations may also be used. The results of the differentially private computations may be stored for later use in calculating or approximating the posterior distribution of the differentially private computation.

The conditional distribution of the differentially private computation is determined (303). The determination may be made by the inference engine 140. The conditional distribution describes the distribution of results that are returned by the differentially private computation given the private data set 137 and the level of differential privacy provided by the differentially private computation (i.e., E). The conditional distribution may be provided to the inference engine 140 by the privacy integrated platform 130.

A posterior distribution of the differentially private computation is probabilistically inferred (305). The inference may be made by the inference engine 140. The posterior distribution may be probabilistically inferred from the stored results of the differentially private computations and the conditional distribution of the differentially private computation. In some implementations, the inference may be made by using Markov Chain Monte Carlo methods, for example; however, other methods of probabilistic inference may also be used.

Figure 4:
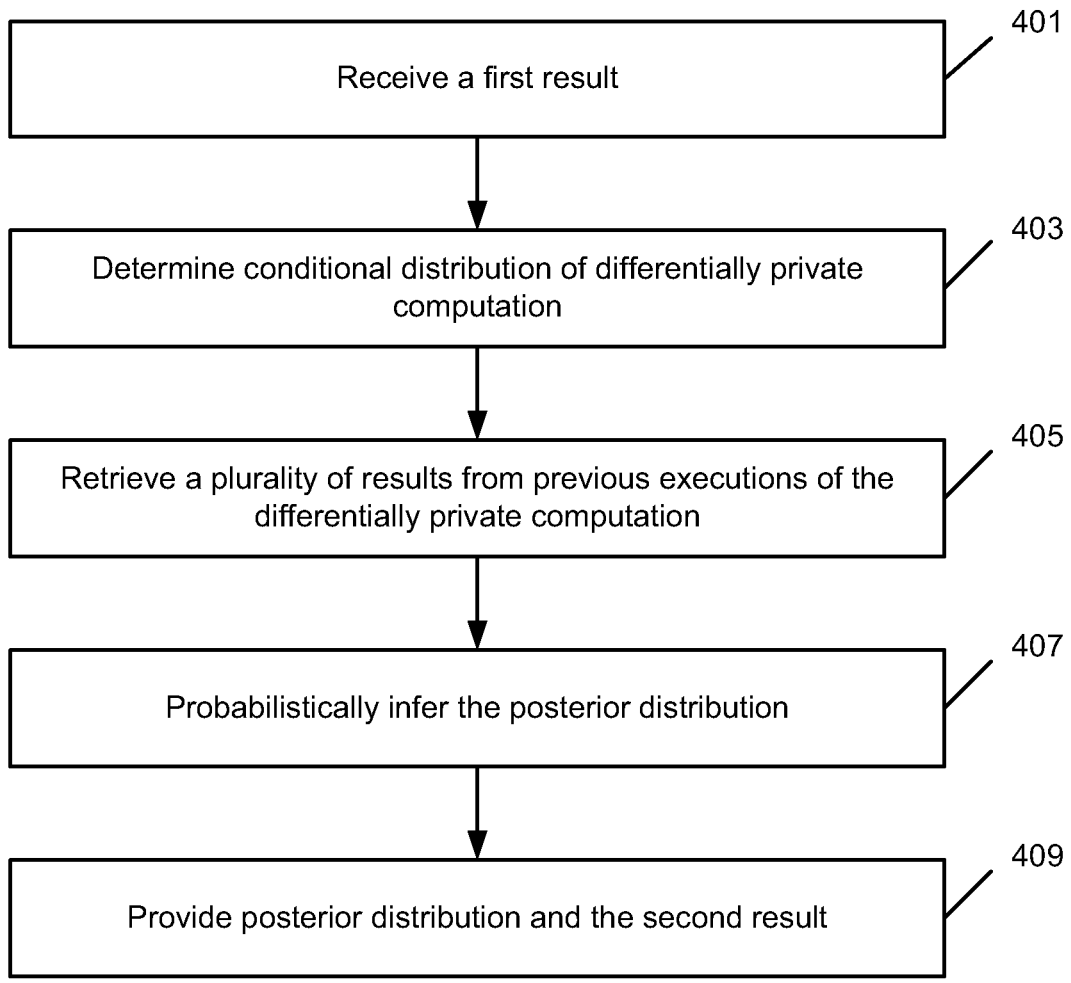
FIG. 4 is an operational flow of an implementation of a method for inferring a posterior distribution for a differentially private computation.

FIG. 4 is an operational flow of a method 400 for inferring a posterior distribution for a differentially private computation. The method 400 may be implemented by the inference engine 140 and the privacy integrated platform 130.

A first result is received (401). The first result may be received by the inference engine 140 from the privacy integrated platform 130. The first result may have been generated from a second result using a differentially private computation in response to a request or a query received by the privacy integrated platform 130 from a user at the client device 110. For example, the second result may be a result generated from the private data set 137 and may include a result generated from private data such as medical data. In order to provide differential privacy to the records in the private data set, noise may be added to the results before they are released to a user or other member of the public. In some implementation, the noise may be Laplacian or Gaussian noise and may be generated by a differentially private computation such as an exponential mechanism. Accordingly, the first result may have been generated from the second result by the privacy integrated platform 130 using differentially private computation and may differ from the second result by some amount of generated noise. Other methods for differential privacy may also be used.

A conditional distribution of the differentially private computation is determined (403). The conditional distribution may be determined by the inference engine 140 from the privacy integrated platform 130. The conditional distribution may describe the probability distribution of the noise added to records by the differentially private computation. In some implementations, the conditional distribution may be a Gaussian or Laplacian distribution. The conditional distribution may be function of the amount differential privacy provided by the differentially private computation (i.e., $\epsilon$).

A plurality of results from previous executions of the differentially private computation is retrieved (405). The results may be retrieved by the inference engine 140. In some implementations, the results were generated in response to previously received queries.

A posterior distribution of the differentially private computation is probabilistically inferred (407). The posterior distribution may be inferred by the inference engine 140. The posterior distribution may be inferred by the inference engine 140 using the conditional distribution and the retrieved results of the differentially private computation. In some implementations, the posterior distribution may be inferred using Markov Chain Monte Carlo methods. Other methods may also be used.

The second result and the inferred posterior distribution are provided (409). The second result and the inferred posterior distribution may be provided by the inference engine 140. As described with respect to 401, the second result may have been generated in response to a query received from a user of the client device 110. Accordingly, the second result and the inferred posterior distribution may be returned to the user at the client device 110.

Figure 5:
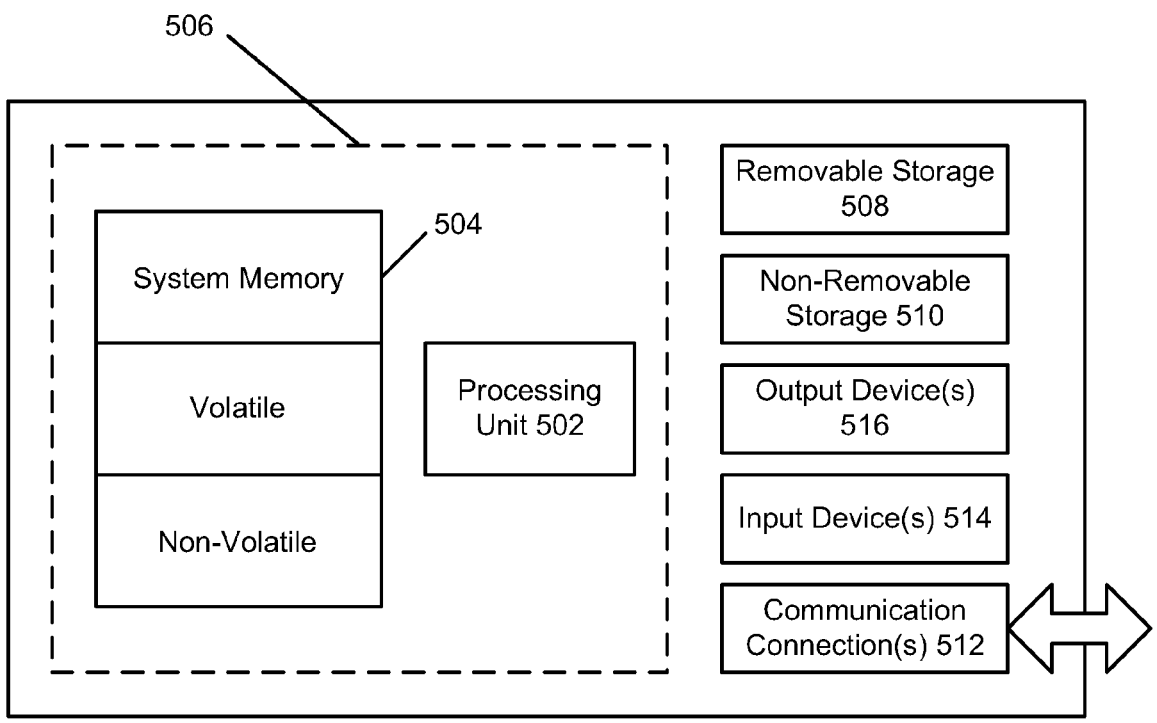
FIG. 5 shows an exemplary computing environment.

FIG. 5 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    generating a noisy result using a differentially private computation from a private data set by a computing device, wherein the differentially private computation adds noise to the private data set using an exponential mechanism;
    determining a conditional distribution of the differentially private computation wherein the conditional distribution describes a probability distribution for the noisy result;
    determining a posterior distribution for the differentially private computation by the computing device using preexisting knowledge about one or more records of the private data set and the conditional distribution, wherein the preexisting knowledge comprises one or more of information about a user whose data is part of the private data set or information about a total number of records of the private data set;
    wherein determining the posterior distribution using the preexisting knowledge about the one or more records of the private data set and the conditional distribution comprises:
        retrieving a plurality of results from previous executions of the differentially private computation that were generated in response to previously received queries; and
        inferring the posterior distribution using the conditional distribution, the plurality of results, and the preexisting knowledge about the one or more records of the private data set using probabilistic inference; and
    providing the posterior distribution by the computing device, wherein the posterior distribution includes the probability that the generated noisy result is a true result from the private data set.

2. The method of claim 1, further comprising providing the noisy result.

3. The method of claim 1, wherein using probabilistic inference comprises using Markov Chain Monte Carlo methods.

4. The method of claim 1, wherein the conditional distribution is one of a Laplacian distribution or a Gaussian distribution.

5. The method of claim 1, wherein the differentially private computation is an exponential mechanism.

6. The method of claim 1, wherein the private data set comprises census data.

7. The method of claim 1, wherein the private data set comprises medical data.

8. A method comprising:
    receiving a noisy first result at a computing device through a network, wherein the noisy first result is generated from a second result of a private data set using a differentially private computation that adds noise to the private data set using an exponential mechanism;
    determining a conditional distribution of the differentially private computation by the computing device, wherein the conditional distribution of the differentially private computation describes a probability distribution for the noisy first result;
    retrieving a plurality of results from previous executions of the differentially private computation that were generated in response to previously received queries;
    probabilistically inferring a posterior distribution of the differentially private computation using the conditional distribution, the plurality of results, and preexisting knowledge about one or more records of the private data set by the computing device, wherein the preexisting knowledge comprises one or more of information about a user whose data is part of the private data set or information about a total number of records of the private data set; and
    providing the posterior distribution by the computing device through the network, wherein the posterior distribution includes the probability that the noisy first result is equal to the second result from the private data set.

9. The method of claim 8, further comprising providing the noisy first result through the network.

10. The method of claim 8, wherein probabilistically inferring the posterior distribution comprises probabilistically inferring the posterior distribution using Markov Chain Monte Carlo methods.

11. The method of claim 8, wherein the conditional distribution is one of a Laplacian distribution or a Gaussian distribution.

12. The method of claim 8, wherein the private data set comprises census data.

13. The method of claim 8, wherein the private data set comprises medical data.

14. A system comprising:
a computing device;
a privacy integrated platform that generates a noisy first result from a second result of a private data set using a differentially private computation, wherein the differentially private computation adds noise to the private data set using an exponential mechanism; and
an inference engine that:
determines a conditional distribution of the differentially private computation, wherein the conditional distribution of the differentially private computation describes a probability distribution for the noisy first result;
generates a posterior distribution for the differentially private computation using preexisting knowledge about one or more records of the private data set and the conditional distribution, wherein the preexisting knowledge comprises one or more of information about a user whose data is part of the private data set or information about a total number of records of the private data set, and wherein generating the posterior distribution using the preexisting knowledge about the one or more records of the private data set and the conditional distribution comprises:
retrieving a plurality of results from previous executions of the differentially private computation that were generated in response to previously received queries; and
inferring the posterior distribution using the conditional distribution, the plurality of results, and the preexisting knowledge about the one or more records of the private data set using probabilistic inference;
receives the generated noisy first result; and
provides the generated noisy first result and the generated posterior distribution, wherein the posterior distribution includes the probability that the generated noisy first result is equal to the second result from the private data set.

15. The system of claim 14, wherein the differentially private computation is an exponential mechanism.

16. The system of claim 14, wherein the conditional distribution is one of a Laplacian distribution or a Gaussian distribution.

\* \* \* \* \*